Jan. 27, 1959 S. E. ANDERSON 2,870,593
CORN HARVESTING MECHANISM
Filed March 25, 1957 2 Sheets-Sheet 1

INVENTOR.
S. E. ANDERSON
ATTORNEYS

Jan. 27, 1959  S. E. ANDERSON  2,870,593
CORN HARVESTING MECHANISM
Filed March 25, 1957  2 Sheets-Sheet 2
FIG. 3
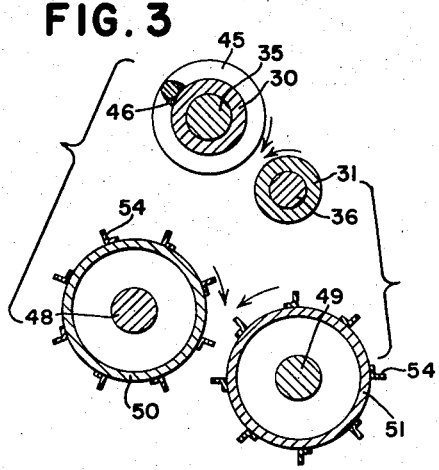
FIG. 4
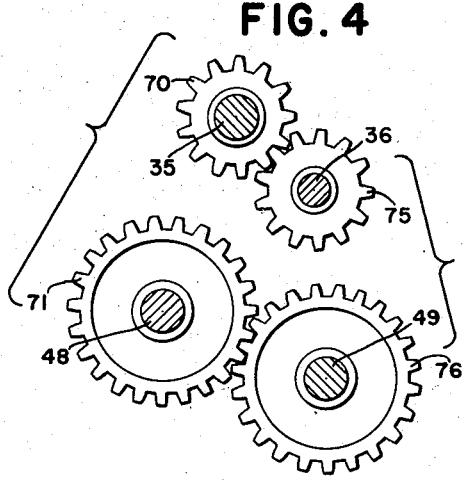
FIG. 5
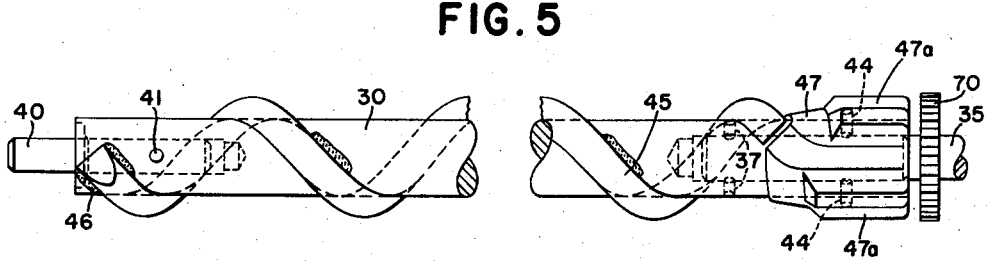
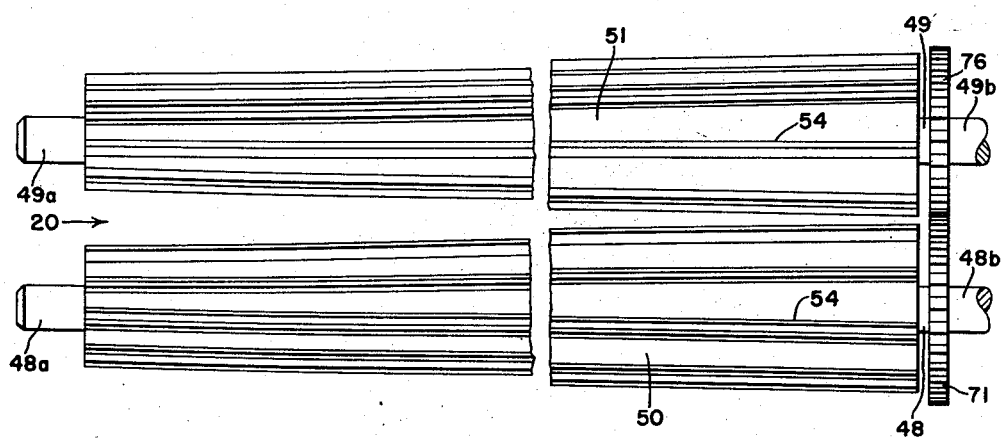
FIG. 6
INVENTOR.
S. E. ANDERSON
ATTORNEYS

United States Patent Office 2,870,593
Patented Jan. 27, 1959

2,870,593

CORN HARVESTING MECHANISM

Sidney E. Anderson, Polk City, Iowa, assignor, by mesne assignments, to Deere & Company, a corporation of Delaware Application March 25, 1957, Serial No. 648,200

5 Claims. (Cl. 56—104)

This invention relates to a corn harvester and particularly to the harvesting mechanism.

One of the primary problems now present in conventional corn pickers is that of premature shelling of the corn while the ears are in the process of being harvested from the stalks. The more conventional method of harvesting corn is to provide a harvesting unit having a stalk passage and movable over a field of row planted corn so that the stalks of the row will move successively through the passage. Harvesting mechanism in the form of a pair of cooperating snapping rolls on opposite sides respectively of the passage are provided which operate to draw the stalks downwardly until the ears contact the rolls thereby serving to "snap" the ears from the stalks. The snapping rolls are normally provided with peripheral lugs or ribs which aggressively engage the stalks to move them downwardly through the rolls. It has been noted that considerable shelling of the corn occurs due to the ears falling against the sharp edges of the lugs or ribs thereby dislodging kernels from the ear, or, in many instances, the ear will wedge itself momentarily against some portion of the corn harvester and a considerable quantity of corn will be shelled from the ear by the edges of the lugs on the snapping rolls.

For moving the stalks rearwardly, there is normally provided a gathering chain with lugs projecting over the rolls which engage the stalks as they move through the harvester. The lugs also provide an obstruction which, upon the ears coming into contact with them creates a premature shelling condition. Also, should the ear of corn momentarily become lodged in the snapping rolls the lugs on the chain will operate to strip the kernels from the ear.

The problem of premature shelling is serious inasmuch as no practical method has as yet been determined to collect the shelled corn and consequently, it is normally lost on the ground.

It is therefore the primary object of this invention to provide a harvesting system which features upper and lower pairs of cooperating rolls, the lower pair of rolls having peripheral means aggressive to draw the stalks downwardly through the upper rolls to cause the ears to be severed from the stalks, and the upper rolls to have peripheral means aggressive to drive the stalks rearwardly and to generally offer only a smooth surface for the ears to contact. By use of the peripheral means on the upper rolls driving the ears and stalks rearwardly, the gathering chains may be reduced in length and be entirely eliminated at the rear portion of the rolls where most of the harvesting occurs. In this manner the lugs on the chain will not come into contact with the ears after their being severed from the stalk.

Also featured is the provision that the lower pair of rows are tapered from front to rear with their axes of rotation substantially parallel. The forward ends of the rolls are thereby spaced further apart than the rear ends with the result that the rolls operate to become progressively more aggressive as the stalks move from the front to the rear of the harvester. By the provision of the tapered rolls the peripheral velocity, at a point where the stalks are first gripped, is maintained relatively low, but increases as the stalk approaches the rear ends of the rolls. This feature therefore permits a smooth flow of stalks into the machine as well as providing a means for moving a large capacity of stalks through the unit.

Other objects and advantages of the present invention will become apparent to those skilled in the art as the nature of the invention is better understood from the following description as illustrated in the accompanying drawings.

Fig. 3 is an enlarged sectional view of the harvesting mechanism as taken along the line 3—3 of Fig. 2.

Fig. 4 is an enlarged sectional view of the gear drive as taken substantially along the line 4—4 of Fig. 2.

Fig. 5 is an enlarged plan view of one of the upper snapping rolls.

Fig. 6 is an enlarged plan view of the lower pair of rolls.

Figure 1:
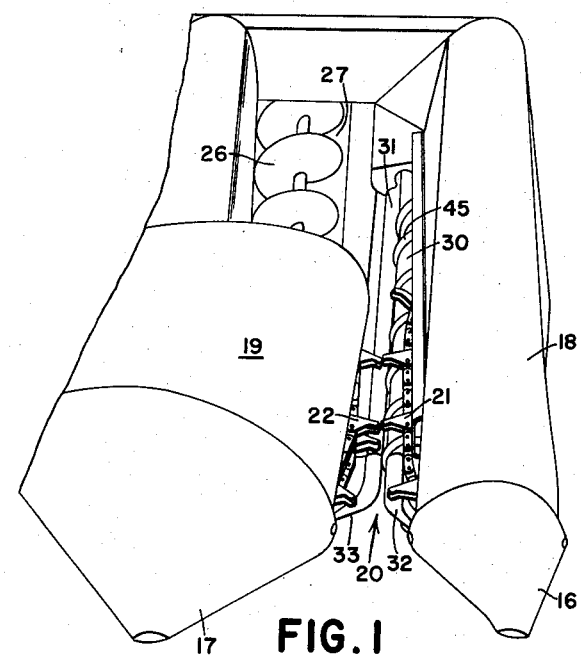
Fig. 1 is a front perspective fragmentary view of a corn harvester attachment normally used in combination with a combine.

Generally speaking, other than the harvesting mechanism, the corn harvesting unit is similar in detail to that shown and described in U. S. Patent 2,794,307. The attachment comprises a main frame 10, mobile in the sense that it will be mounted on a combine to move forwardly over a field. The main frame 10 is composed of forwardly extending rigid members, as at 11, fixed at their rear ends to a transverse tubular member 12, and upright and transverse frame structure 13 which has its lower ends connected also to the tubular member 12. Fixed to the forward end of the frame portion 11 is additional structure 14 which offers support to the forward end of the harvester.

It is here noted that the attachment is for a two-row unit. Both the harvesting mechanism on the left and right rolls are symmetrical and consequently the right row unit will not be shown or described. Mounted on the main frame 10 is housing structure including outer and central styling 18 and 19 extending rearwardly from the divider points 16 and 17 to form between them a fore-and-aft extending passage 20 which receives the stalks as the unit moves over the field. Provided at the forward end of the harvester unit are a pair of gathering chains 21, 22 positioned on opposite sides of the passage 20, which cooperate to drive the stalks rearwardly as they are received into the unit. Positioned inwardly from the stalk passage 20 and at the rear portion of the harvester attachment is an auger type conveyor including an auger 26 and its auger housing 27. The auger 26 and auger housing 27 is at a lower level than the harvesting mechanism which, will later be fully described, and receives the ears of corn from the harvesting mechanism and conveys them rearwardly to the mouth of the combine.

The harvester, up to this point of the description, is conventional, a similar one having been on the market for some time, and is similar to the structure shown in the aforementioned U. S. Patent 2,794,307.

The harvesting mechanism comprises an upper pair of snapping elements or rolls 30, 31, positioned on opposite sides of the stalk passage respectively to receive the stalks between them. As may be seen from Fig. 3, the upper roll 30 is offset vertically from the roll 31 to serve as a means to move the ears severed from the stalks into the auger housing 27. The forward ends of the rolls 30, 31 are supported by shoes 32, 33, respectively, which in turn is carried by the framework 14. Suitable adjustments are provided to move the shoe 32 laterally to increase or decrease the distance between the rolls 30, 31. Details have however, been omitted, since it is not a part of this invention. The rear end of the upper rolls 30, 31 are supported on the upright plate 13 by means of bushings, only one being shown at 34, and drive shafts 35, 36.

The manner of mounting the drive shafts 35, 36 in the respective snapping rolls 30, 31 is shown in Fig. 5 relative to the shaft 35 and roll 30. As may there be seen the shaft 35 fits in a hollow end of the roll 30 and is held against axial and radial movement relative to the shaft by means of set screws 37. A similar mounting arrangement is provided at the forward end of the snapping roll 30 and comprises a shaft 40 which is fixed to the snapping roll 30 by means of a set screw 41. The forward end of the shaft 40 is journaled in the shoe 32. A similar arrangement is provided for mounting the inner snapping roll 31 on the harvester.

Spiraled around the periphery of the snapping roll 30 is a rib 45. The rib 45 is fixed to the roll 30 by welding 46 and as may be seen from Figs. 3 and 5 the rib 45 has, in cross section, a rounded outer tip and an inner edge adjacent to the periphery of the roll 30. It may be noted, therefore, that the upper rolls 30, 31 have at no place a sharp edge on which an ear may strike. The roll 30 is also provided at its rear end with an extension 47 having longitudinal ribs 47a for aggressively clearing trash from the upper rolls. The extension 47a is fixed to the shaft by means of set screws 44.

A second or lower pair of cooperating rolls 50, 51 is positioned beneath the upper pair of rolls 30, 31. The rolls 50, 51 are supported by means of drive shafts 48, 49 which extend through and are rigid with the rolls 50, 51 and which are journaled at their forward ends 48a, 49a respectively on the framework 14 in conventional manner, provision for lateral adjustment between the rolls also being afforded. The rear ends 48b, 49b of the shafts 48, 49 are journaled by means of bushings 52, 53 respectively to the upright plate structure 13. Each of the rolls 50, 51 are provided with radially extending ribs 54 which extend substantially the length of the rolls. The rolls are tapered from front to rear and are spaced apart at their forward end to prevent unobstructed entrance of the stalks in the stalk passage 20. The adjacent sides of the rolls 50, 51 converge rearwardly inasmuch as their supporting shafts 48, 49 are substantially parallel.

Figure 2:
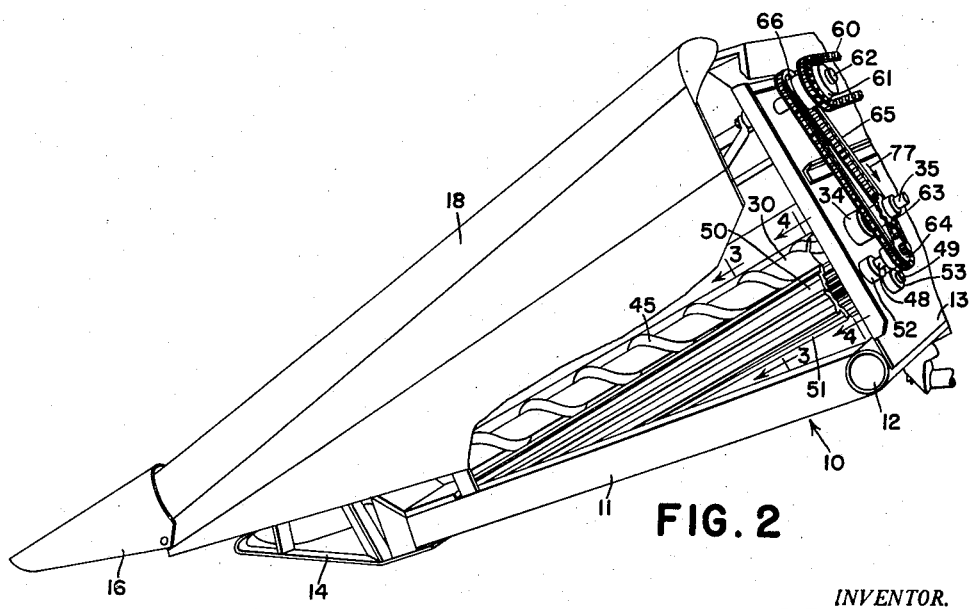
Fig. 2 is a side perspective of the attachment shown in Fig. 1 with portions broken away to clearly show parts of the invention.

Drive means for operating the rolls is provided at the rear of the harvester attachment and comprises basically a chain drive shown only partially by the chain 60 and sprocket 61, driven directly from the combine drive, which is keyed or fixed to a shaft 62. Mounted on the shafts 35, 48 are a pair of drive sprockets 63, 64 over which is mounted a chain 65 which is driven by a sprocket 66 fixed to the shaft 62. The shafts 35, 48 are also provided with pinions 70, 71 respectively. Gears 75, 76 are fixed to the drive shafts 36, 49 and mesh with their respective pinions 70, 71. The chain 65, driven in the direction of the arrow 77 (Fig. 2), causes the adjacent portions of the upper rolls 30, 31 and the adjacent portions of the lower rolls 50, 51 to move downwardly.

The harvesting mechanism operates in the following manner. Stalks entering the stalk passage 20 will first be engaged by the gathering chains 21, 22 and will be moved rearwardly. It will be noted in Fig. 1 that the gathering chains extend only partially the length of the upper rolls 30, 31. The stalks will, therefore, upon leaving the upper end of the gathering chains 31, be engaged by the spiral rib 45 of the upper roll 30 and will be aggressively fed rearwardly by the upper rolls.

The upper rolls 35, 36 are so spaced that stalks will pass between the peripheries of the rolls but ears of corn will not so pass. The lower rolls 50, 51 operate to aggressively draw the stalks downwardly and out of the harvester. Being tapered the rolls 50, 51 will become progressively more aggressive as the stalks move into the passage. Also, due to the increased peripheral speed at the rear portions of the rolls 50, 51, the rolls will tend to drive the stalks downwardly at a relatively high rate of speed at the rear of the unit or substantially at the position where it is desired to break the ear from the stalk. By drawing the stalks downwardly the ears of corn will be severed from the stalks when they contact the upper rolls 30, 31. As mentioned previously there are no sharp edges on the upper rolls which an ear of corn may contact, the rib 45 being rounded to provide a smooth surface. The rib 45 may therefore be treated as peripheral means on the roll 30 for moving the stalk rearwardly and the ribs 54 on the lower rolls 50, 51 may be treated as peripheral means for drawing the stalks downwardly. Therefore, by use of this harvesting mechanism the desired results of having aggressive means for driving the stalks downwardly and out of the stalk passage, aggressive means for moving the stalks rearwardly, and relatively smooth surfaces on the snapping rolls for reducing the amount of shelled corn have all been provided. Also since the ribbed roll 30 is offset vertically above the smooth roll 31, the rib 45 will tend to bump the ears laterally and into the auger housing 27.

While only one form of the invention has been shown, it is recognized that other forms and variations would unquestionably occur to those familiar with the art. It should, therefore, be recognized that while the details of the present invention were illustrated for the purpose of clearly and concisely presenting the principles of the invention, it is desired not to so limit or narrow the invention beyond that which is claimed.

What is claimed is:

1. Harvesting mechanism for a corn harvester of the type having a main mobile frame and a forwardly extending gathering structure mounted on the frame and forming a fore-and-aft extending stalk passage for receiving stalks into the harvester as it advances over the field, said harvesting mechanism comprising: an upper pair of cooperating rolls supported on the frame and positioned on opposite sides of the passage respectively and spaced apart to permit relative free passage of the stalks while preventing passage of ears of corn; a lower pair of rolls supported on the frame beneath the upper rolls and closely spaced on opposite sides respectively of the stalk passage and operative upon rotation to aggressively engage the stalks for drawing them downwardly between the upper rolls to effect detachment of the ears from the stalks by the upper rolls; and a peripheral spiral rib on at least one of the upper rolls for feeding the stalks rearwardly.

2. The invention defined in claim 1 further characterized by the upper rolls, other than said rib, being substantially smooth, and the rib is characterized by having an inner surface adjacent and fixed to the periphery of its respective roll and an outer rounded surface spaced from the periphery of the snapping roll.

3. Harvesting mechanism for a corn harvester of the type having a main mobile frame and a forwardly extending gathering structure mounted on the frame and forming a fore-and-aft extending stalk passage for receiving stalks into the harvester as it advances over the field, said harvesting mechanism comprising: an upper pair of cooperating rotatable rolls supported on the frame and positioned on opposite sides of the passage respectively and spaced apart to permit relative free passage of the stalks while preventing passage of ears of corn; a lower pair of forwardly tapering rolls supported on the frame for rotation about substantially parallel axes, said lower rolls having their forward ends disposed beneath the forward ends of the upper rolls and their rear ends disposed beneath the rear ends of the upper rolls and on opposite sides respectively of the stalk passage and operative upon rotation to aggressively engage the stalks for drawing them downwardly between the upper rolls to effect detachment of the ears from the stalks by the upper rolls; and a peripheral spiral rib on at least one of the upper rolls for feeding the stalks rearwardly; and drive means connected to and for rotating said pairs of rolls.

4. Harvesting mechanism for a corn harvester of the type having a main mobile frame and a forwardly extending gathering structure mounted on the frame and forming a fore-and-aft extending stalk passage for receiving stalks into the harvester as it advances over the field, said harvesting mechanism comprising: an upper pair of cooperating rotatable rolls supported on the frame and positioned on opposite sides of the passage respectively and spaced apart to permit relative free passage of the stalks while preventing passage of ears of corn; a lower pair of forwardly tapering rolls supported on the frame for rotation about substantially parallel axes, said lower rolls having their forward ends disposed beneath the forward ends of the upper rolls and their rear ends disposed beneath the rear ends of the upper rolls and on opposite sides respectively of the stalk passage and operative upon rotation to progressively effect aggressive engagement of the stalks as the harvester advances for drawing the stalks downwardly between the upper rolls to cause detachment of the ears from the stalks by the upper rolls.

5. Harvesting mechanism for a corn harvester of the type having a main mobile frame and a forwardly extending gathering structure mounted on the frame and forming a fore-and-aft extending stalk passage for receiving stalks into the harvester as it advances over the field, said harvesting mechanism comprising: an upper pair of snapping rolls supported on the frame and positioned on opposite sides of the passage respectively and spaced apart to permit relatively free passage of the stalks while preventing passage of ears of corn; a lower pair of rolls rotatably supported on the frame beneath the snapping rolls and on opposite sides of the passage, said lower rolls being tapered between their front to rear ends and spaced apart at their forward ends to permit relative free passage of stalks and having their adjacent sides converging rearwardly, and operative upon rotation to progressively effect aggressive engagement of the stalks as the harvester advances for drawing them downwardly between the snapping rolls to cause detachment of the ears; and peripheral means on at least one of the snapping rolls for aggressively moving the stalks rearwardly.

References Cited in the file of this patent

UNITED STATES PATENTS

| | | |
|---|---|---|
| 309,462 | Hopper | Dec. 16, 1884 |
| 1,023,320 | Kaull | Apr. 16, 1912 |
| 2,180,594 | Kuhlman | Nov. 21, 1939 |
| 2,229,628 | Anderson | Jan. 28, 1941 |
| 2,234,447 | Norman | Mar. 11, 1941 |
| 2,665,538 | Andrews | Jan. 12, 1954 |